(12) United States Patent
Hirabayashi et al.

(10) Patent No.: US 11,235,604 B2
(45) Date of Patent: Feb. 1, 2022

(54) PRINTING APPARATUS

(71) Applicant: SEIKO EPSON CORPORATION, Tokyo (JP)

(72) Inventors: Kenichi Hirabayashi, Shiojiri (JP); Hironori Maekawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 16/804,831

(22) Filed: Feb. 28, 2020

(65) Prior Publication Data
US 2020/0276848 A1 Sep. 3, 2020

(30) Foreign Application Priority Data

Mar. 1, 2019 (JP) .............................. JP2019-037295

(51) Int. Cl.
| | |
|---|---|
| *B41J 29/13* | (2006.01) |
| *B41J 29/38* | (2006.01) |
| *B41J 11/02* | (2006.01) |
| *B41J 25/304* | (2006.01) |
| *F16H 3/44* | (2006.01) |

(52) U.S. Cl.
CPC .............. *B41J 29/13* (2013.01); *B41J 11/02* (2013.01); *B41J 25/304* (2013.01); *B41J 29/38* (2013.01); *F16H 3/44* (2013.01); *B65H 2402/441* (2013.01); *B65H 2402/442* (2013.01); *B65H 2402/45* (2013.01); *B65H 2403/42* (2013.01)

(58) Field of Classification Search
CPC . B41J 29/13; B41J 29/38; B41J 25/304; B41J 11/02; F16H 3/44; B65H 2402/442; B65H 2402/441; B65H 2402/45; B65H 2403/42
See application file for complete search history.

(56) References Cited

U.S. PATENT DOCUMENTS

| | | | |
|---|---|---|---|
| 6,491,459 B2 * | 12/2002 | Hosomi | ................. B41J 15/042 400/613 |
| 8,985,730 B2 | 3/2015 | Gotschewski | |
| 2013/0256970 A1 * | 10/2013 | Nguyen | .................... B65H 5/00 271/3.14 |
| 2016/0159601 A1 | 6/2016 | Nakatsu et al. | |
| 2019/0389680 A1 * | 12/2019 | Miyagawa | ......... H04N 1/00588 |

FOREIGN PATENT DOCUMENTS

| | | |
|---|---|---|
| JP | 2015-020875 | 2/2015 |
| JP | 2018-039234 | 3/2018 |

* cited by examiner

*Primary Examiner* — Henok D Legesse
(74) *Attorney, Agent, or Firm* — Workman Nydegger

(57) ABSTRACT

With a cover in a closed position, a first internal gear and a first spur gear do not mesh with each other, and a second internal gear and a second spur gear do not mesh with each other. When the cover rotates by a predetermined angle around a first support shaft from the closed position, the first internal gear and the first spur gear start to mesh with each other. When the cover rotates by a predetermined angle around a second support shaft from the closed position, the second internal gear and the second spur gear start to mesh with each other.

5 Claims, 6 Drawing Sheets

PRINTING APPARATUS

The present application is based on, and claims priority from JP Application Serial Number 2019-037295, filed Mar. 1, 2019, the disclosure of which is hereby incorporated by reference herein in its entirety.

BACKGROUND

1. Technical Field

The present disclosure relates to a printing apparatus.

2. Related Art

In a known printing apparatus that houses a recording medium such as roll paper, a housing portion is covered with a cover that opens and closes with one end as a rotational movement center (see, for example, U.S. Pat. No. 8,985,730).

In the printing apparatus, work for housing and mounting a consumable item such as a recording medium may be limited by an opening direction of the cover. For example, when a continuous sheet is used as the recording medium, the cover of the housing portion is opened and the continuous sheet is set in the printing apparatus.

However, the cover that covers the housing portion opens in one direction, and the opening direction is only one. Thus, it may be difficult to perform the work from a direction opposite to the opening direction. Further, when the printing apparatus is arranged in consideration of the working operation, an arrangement place of the printing apparatus may be constrained.

The present disclosure has been made in view of the above-mentioned problem, and an object thereof is to facilitate, in an apparatus that performs printing on a recording medium, work for housing the recording medium into the apparatus, and the like.

SUMMARY

One aspect for solving the above-described problem is a printing apparatus including a printing unit configured to perform printing on a recording medium, a housing portion configured to house an article needed for printing, a cover configured to open and close the housing portion, and a support shaft portion configured to rotatably support the cover, where the support shaft portion includes a first support shaft in a position farther than the housing portion from the printing unit, and a second support shaft in a position not farther than the housing portion from the printing unit, a circumferential portion of the first support shaft is provided with a first internal gear configured to mesh with a first spur gear provided at the cover, and a circumferential portion of the second support shaft is provided with a second internal gear configured to mesh with a second spur gear provided at the cover, with the cover in a closed position, the first internal gear does not mesh with the first spur gear, and the second internal gear does not mesh with the second spur gear, when the cover rotates by a predetermined angle around the first support shaft from the closed position, the first internal gear and the first spur gear start to mesh with each other, and when the cover rotates by a predetermined angle around the second support shaft from the closed position, the second internal gear and the second spur gear start to mesh with each other.

In the printing apparatus described above, a transport unit may be configured to transport an external recording medium to the printing unit, the cover in a first open position may form, in the housing portion, an opening through which the recording medium is insertable to the housing portion, and also open, at one end of the housing portion, an insertion opening that guides the external recording medium into a printing apparatus main body, and the cover in a second open position may form, in the housing portion, an opening through which the recording medium and the external recording medium are loadable on the transport unit.

The printing apparatus described above may further include a first engagement member provided at the cover, and configured to engage with the first support shaft such that the cover is rotatable from the closed position of the cover to a first open position, and disengage from the first support shaft by moving with respect to the first support shaft, and a second engagement member provided at the cover, and configured to engage with the second support shaft such that the cover is rotatable from the closed position of the cover to a second open position, and disengage from the second support shaft by moving with respect to the second support shaft.

The printing apparatus described above may further include a first damper configured to apply a load to rotation of the first spur gear, and a second damper configured to apply a load to rotation of the second spur gear.

In the printing apparatus described above, the second support shaft may be located in a direction opposite to a discharge direction of the recording medium with respect to the first support shaft.

DESCRIPTION OF EXEMPLARY EMBODIMENTS

Figure 1:
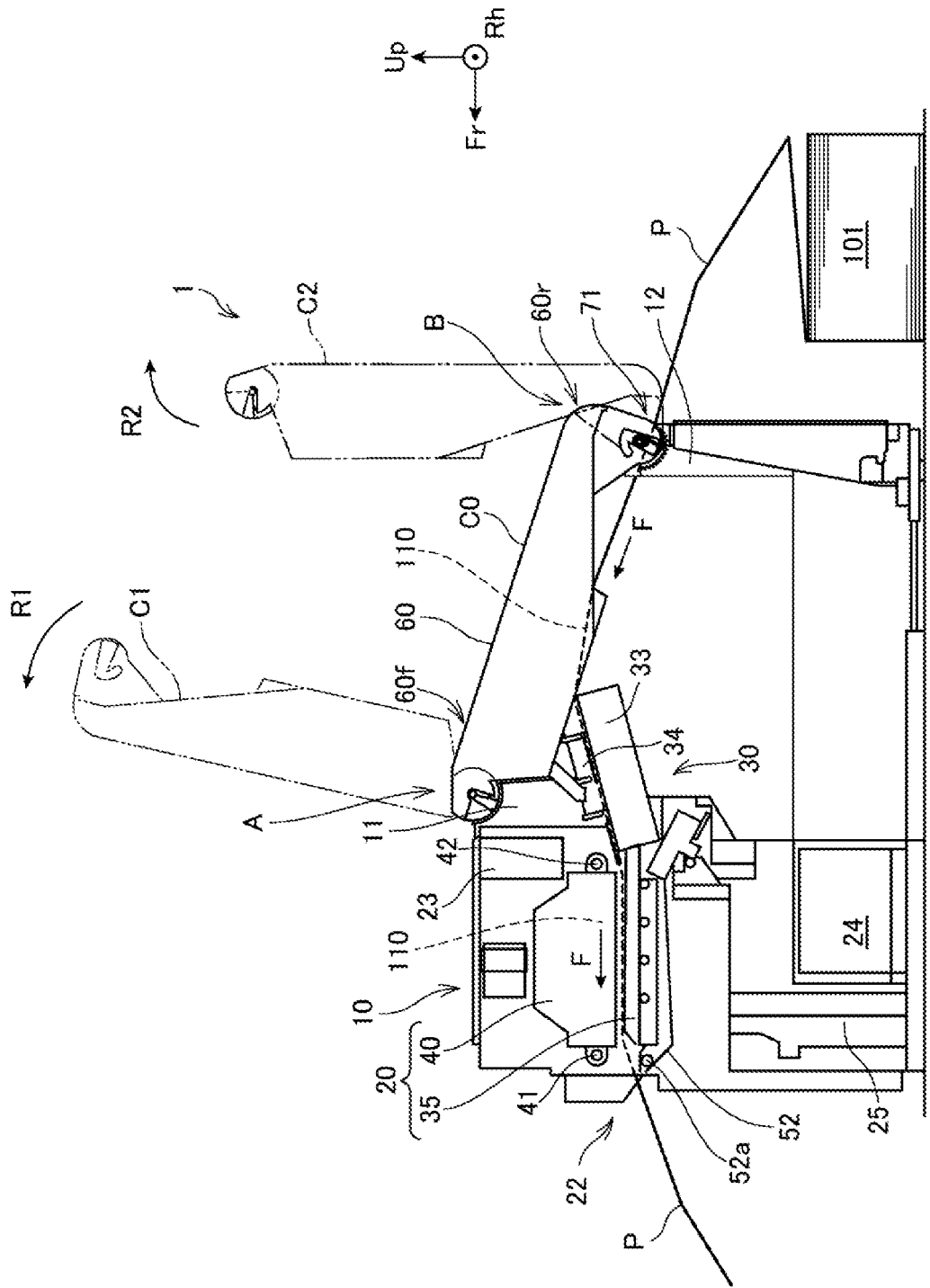
FIG. 1 is a side view illustrating an internal structure of a printing apparatus loaded with fanfold paper.

Exemplary embodiments of the present disclosure are described below with reference to the accompanying drawings. In the drawings, a reference sign Up represents an upper side, a reference sign Fr represents a front side, and a reference sign Rh represents a right side.

As illustrated in FIG. 1, a printing apparatus 1 includes a printing apparatus main body 10. The printing apparatus main body 10 is provided with a printing unit 20 that performs printing on a recording medium, a housing portion 21 that houses the recording medium, and a cover 60 that covers the housing portion 21. In the printing apparatus main body 10, the housing portion 21 is provided behind the printing unit 20.

A sheet P illustrated in FIG. 1 is fanfold paper 101. The sheet P is guided to a paper guide 33 and a paper holder 34, and is fed to the printing unit 20 on the front side. The sheet P printed by the printing unit 20 is discharged from a paper exit 22 formed on a front surface of the printing apparatus 1. The paper guide 33 is a rest that supports the sheet P from below. The paper holder 34 is located above the sheet P so as to face the paper guide 33, and holds down floating of the sheet P.

The printing unit 20 is disposed in front of the paper guide 33 and the paper holder 34. The printing unit 20 includes a platen 35, a printing head 40, and carriage guide shafts 41 and 42. The printing head 40 in the present exemplary embodiment can spray ink in a plurality of colors. As the ink that can be sprayed, for example, ink in four colors of cyan, magenta, yellow, and black can be sprayed onto the sheet P. The ink is stored in an ink cartridge 24.

The ink cartridge 24 is disposed in a front lower portion of the printing apparatus main body 10. An ink supply unit 23 is provided in a front upper portion of the printing apparatus main body 10. The ink in the ink cartridge 24 is supplied to the printing head 40 via the ink supply unit 23. The printing head 40 performs scanning along the carriage guide shafts 41 and 42 disposed in a left-and-right width direction of the printing apparatus 1, and performs printing on the sheet P. Further, a substrate 25 that controls an operation of the printing apparatus 1 is disposed in front of the ink cartridge 24.

The platen 35 of the printing unit 20 has a flat surface disposed along a transport direction F. This flat surface is located below a transport path 110 of the sheet P, and faces the printing head 40. The platen 35 is fixed to the printing apparatus main body 10 of the printing apparatus 1, and supports the sheet P from below. The flat surface of the platen 35 is substantially horizontal in an installation state and a use state of the printing apparatus 1. A transport belt 52 passes over the flat surface of the platen 35. The transport belt 52 is a wide and endless-shaped belt, and is disposed so as to go around to the lower side of the platen 35 from above the flat surface of the platen 35 via a roller 52a.

Of a front surface of the transport belt 52, at least a surface facing upward on the flat surface of the platen 35 is a rough surface with a high coefficient of friction. The transport belt 52 may be formed of an elastic material such as rubber and synthetic resin. A drive mechanism (not illustrated) that moves the transport belt 52 is disposed below the platen 35.

A driven roller (not illustrated) is disposed between the printing head 40 and the paper holder 34 so as to face the platen 35.

The driven roller is rotatably supported on the printing apparatus main body 10 of the printing apparatus 1. The driven roller is biased toward the flat surface of the platen 35. In the transport path 110, the sheet P is sandwiched between the driven roller (not illustrated) and the transport belt 52, and is reliably transported in the transport direction F as the transport belt 52 moves.

Further, a holding roller (not illustrated) that holds down the sheet P so as to prevent floating of the sheet P from the transport belt 52 is disposed on the printing head 40. The paper guide 33, the paper holder 34, the transport belt 52, the roller 52a, and the mechanism for driving the transport belt 52 constitute a transport unit 30 that transports the sheet P to the printing unit 20.

A cutter unit for cutting the sheet P can be mounted on the front surface of the printing apparatus main body 10. The cutter unit may make a cut while leaving a part of the sheet P in the width direction, or may completely cut the sheet P. The printing apparatus 1 cuts the sheet P printed by the printing head 40 to a predetermined length by the cutter unit, and can discharge the sheet P from the paper exit 22.

A winding unit (not illustrated) can be attached to and detached from the front surface of the printing apparatus main body 10 below the paper exit 22. The winding unit includes a winding drum that winds the sheet P discharged from the paper exit 22, and a drive unit (not illustrated) that rotates the winding drum, and the winding unit can wind the sheet P. A peeler may be attached to the front surface of the printing apparatus main body 10. The peeler can wind release paper while removing a label from the release paper.

The housing portion 21 having an open upper portion is provided in the rear portion of the printing apparatus main body 10. The housing portion 21 is disposed behind the printing unit 20. The paper guide 33 and the paper holder 34 are disposed in the housing portion 21. The housing portion 21 is covered by the cover 60.

According to the present exemplary embodiment, the cover 60 is supported by a front support portion 11 and a rear support portion 12 so as to be freely open and closed in two directions R1 and R2. A rear portion 60r of the cover 60 is rotationally moved in the first direction R1 with respect to the front support portion 11, and the cover 60 is rotationally moved to a first open position C1. Further, a front portion 60f of the cover 60 is rotationally moved in the second direction R2 with respect to the rear support portion 12, and the cover 60 is rotationally moved to a second open position C2.

Figure 2:
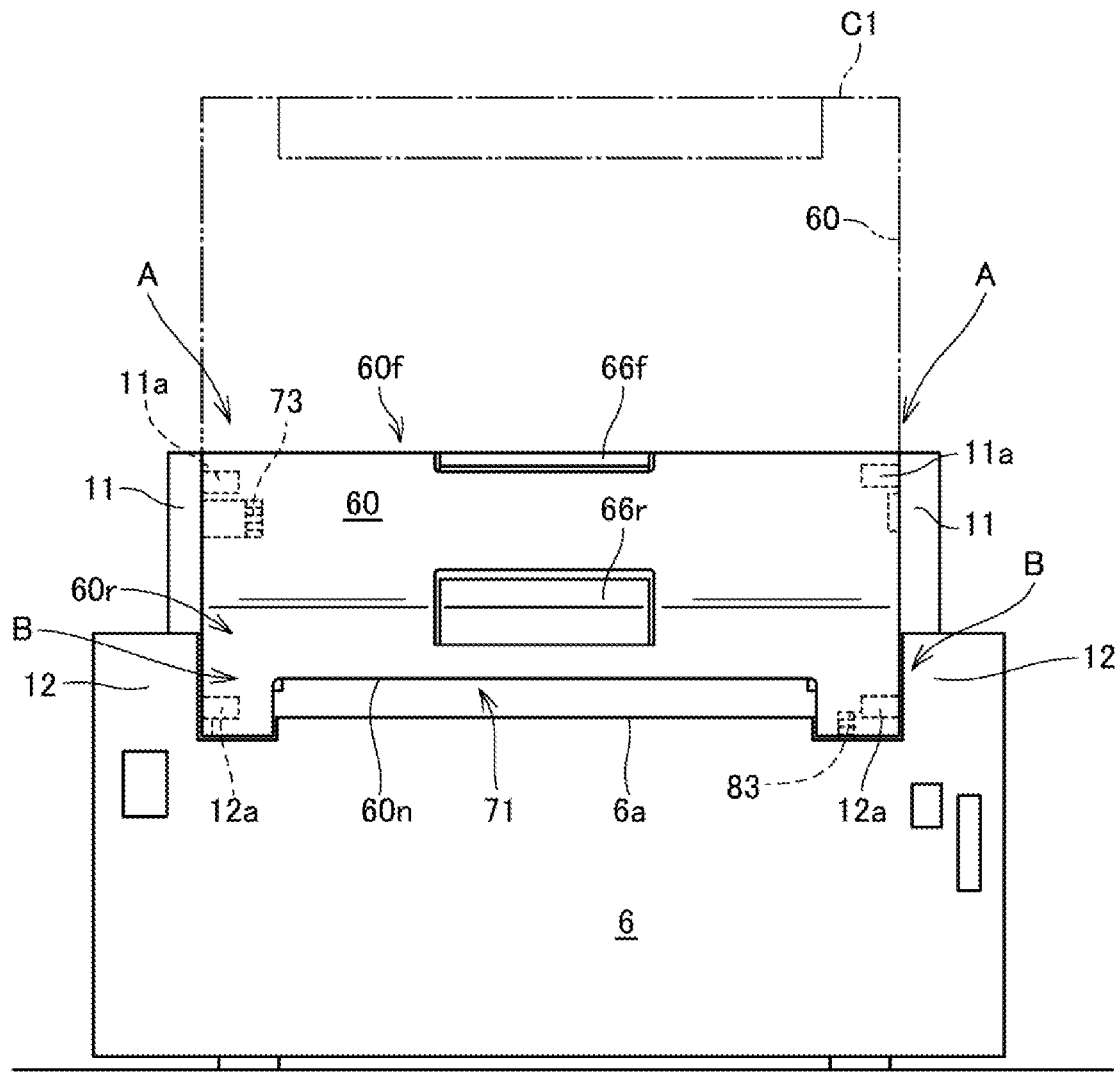
FIG. 2 is a back view of the printing apparatus.

FIG. 2 is a back view of the printing apparatus.

As illustrated in FIG. 2, an insertion opening 71 is formed in a rear surface of the printing apparatus 1 with the cover 60 being closed. The insertion opening 71 is formed between a notch 60n provided in a lower portion of the rear portion 60r and a rear upper edge 6a of an outer packaging 6 of the printing apparatus 1. The insertion opening 71 is formed in an upper portion of a rear end of the housing portion 21.

As illustrated in FIG. 1, the fanfold paper 101 passes through the insertion opening 71 that communicates with the housing portion 21, and is supplied to the inside of the printing apparatus 1.

The notch 60n is formed open to a position exceeding a height of a second support shaft 12a, which will be described later, in a position C0 in which the cover 60 illustrated in FIG. 1 is closed. In this way, with the cover 60 being open to the second open position C2, the insertion opening 71 is formed between the notch 60n and the outer packaging 6. Therefore, even when the cover 60 is located in the second open position C2, the insertion opening 71 is exposed to the rear, and thus the sheet P can pass through the insertion port 71 and the printing apparatus 1 can be loaded with the fanfold paper 101.

Further, the rear portion 60r of the cover 60 is rotationally moved in the first direction R1 with respect to the front support portion 11, and the cover 60 is rotationally moved to the first open position C1. When the cover 60 is rotationally moved to the first open position C1, the housing portion 21 and an opening surrounded by the cover 60 in the first open position C1 open greatly toward the rear of the printing apparatus 1. In this way, even when the cover 60 is located in the first open position C1, the fanfold paper 101 disposed behind the printing apparatus 1 can be more easily loaded from the rear of the printing apparatus 1.

Figure 3:
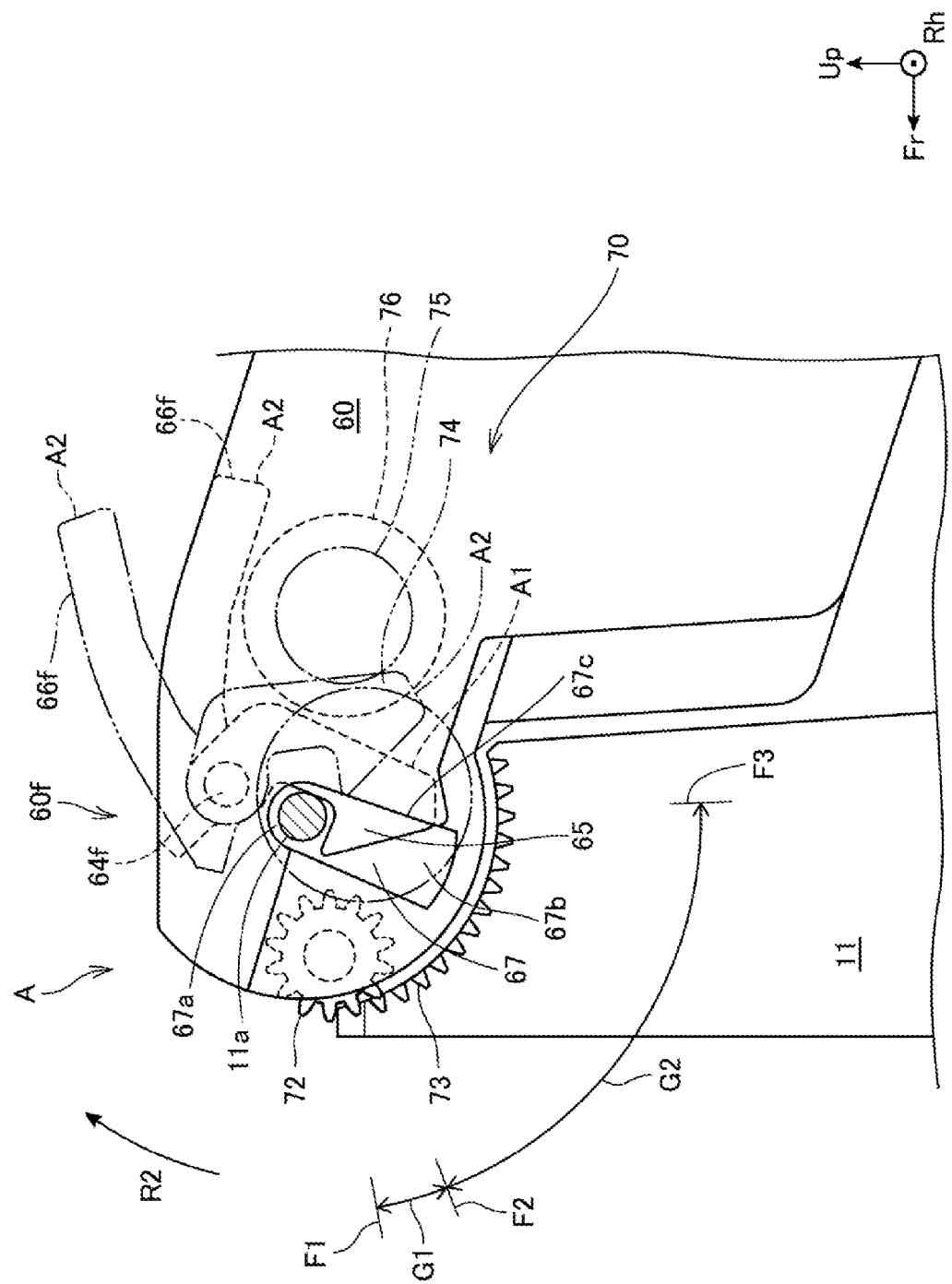
FIG. 3 is a side view of a main portion illustrating an engagement mechanism of a front support portion and a cover front portion.

FIG. 3 is a side view of a main portion illustrating an engagement mechanism A of the front support portion 11 and the front portion 60f of the cover 60. The front portion 60f of the cover 60 is disposed between the front support portions 11 provided on left and right side portions of the printing apparatus main body 10. A first support shaft 11a that extends toward the cover 60 is provided on each of the left and right front support portions 11. Each of the left and right first support shafts 11a together with the second support shaft 12a, which will be described later, constitute a support shaft portion 60a that rotatably supports the cover 60.

When the front portion 60f of the cover 60 is opened, engagement between the engagement mechanism A and the first support shaft 11a is released, and the front portion 60f is separated from the front support portion 11.

The first support shaft 11a is a short pin protruding toward the cover 60. An extension direction of the first support shaft 11a coincides with the left-and-right direction of the printing apparatus 1.

The engagement mechanism A is constituted by a first engagement member 65 that engages with the first support shaft 11a, a front rod 64f that is a rotational movement shaft of the first engagement member 65, and a front lever 66f that releases the engagement. The first engagement members 65 provided on the left and right of the front portion 60f of the cover 60 are fixed to left and right end portions of the front rod 64f so as to be relatively rotationally immovable.

The front lever 66f is fixed to the center of the front rod 64f, and the front lever 66f is rotatably supported on the cover 60 with the front rod 64f as a rotational movement shaft.

In the position C0 illustrated in FIG. 1 in which the cover 60 is closed, the first support shaft 11a fits into a guide groove 67 provided on each of left and right side surfaces of the front portion 60f, and is engaged by the first engagement member 65. The first engagement member 65 is configured to have a hook shape in which a tip portion is curved in a rotational movement direction. The first engagement member 65 is movable between an engagement position A1 and a release position A2.

The first engagement member 65 is biased by a biasing member (not illustrated) so as to move from the release position A2 to the engagement position A1.

The guide groove 67 is provided obliquely downward on a partway portion in a thickness direction of the front portion 60f in a closed state of the cover 60.

When the front portion 60f of the cover 60 is closed, the first support shaft 11a is introduced into the guide groove 67 from a lower end portion 67b of the guide groove 67. Then, the first support shaft 11a abuts the first engagement member 65, and rotationally moves the first engagement member 65 toward the release position A2. When the first support shaft 11a reaches an upper end portion 67a of the guide groove 67, the first engagement member 65 returns to the engagement position A1. Then, the first support shaft 11a is held between the upper end portion 67a of the guide groove 67 and the first engagement member 65. In this way, the engagement mechanism A and the first support shaft 11a engage with each other.

In the engagement position A1, the first engagement member 65 protrudes from a rear surface 67c of the guide groove 67 toward the guide groove 67. In the guide groove 67, the first engagement member 65 is configured to have a shape in which the amount of protrusion into the guide groove 67 is reduced toward the lower end portion 67b of the guide groove 67.

When the front portion 60f of the cover 60 is closed, the front portion 60f is rotationally moved downward around the second support shaft 12a illustrated in FIG. 2. In this way, the first support shaft 11a is introduced into the guide groove 67, and the first support shaft 11a pushes and rotationally moves the first engagement member 65. Then, when the first support shaft 11a reaches the upper end portion 67a of the guide groove 67, the first engagement member 65 protrudes into the guide groove 67, and the first support shaft 11a is locked by the first engagement member 65 and the guide groove 67.

When the cover 60 opens from the front portion 60f, the locking of the first support shaft 11a is released. At this time, the front lever 66f is rotationally moved upward around the front rod 64f. In this way, the front lever 66f and the first engagement member 65 move to the release position A2.

Then, the first engagement member 65 retracts from the inside of the guide groove 67. In this way, the locking of the first support shaft 11a is released, and the front portion 60f of the cover 60 can rotationally move in the second direction R2 with the first support shaft 11a fitted in the guide groove 67.

In the present exemplary embodiment, a buffering mechanism 70 as a gear wheel train that buffers a rotational movement around the front portion 60f is provided around the first support shaft 11a. The buffering mechanism 70 is constituted by a first internal gear 73 provided on an upper end portion of the front support portion 11 of the printing apparatus 1, a first spur gear 72 provided on the front portion 60f of the cover 60, an intermediate gear 74, a first damper 76, and a damper gear 75 attached to a rotary shaft of the first damper 76.

The first spur gear 72 is rotatably supported by the cover 60. A rotational movement shaft of the first spur gear 72 coincides with the left-and-right direction of the printing apparatus 1. The intermediate gear 74 meshing with the first spur gear 72 transmits the rotation of the first spur gear 72 to the first damper 76 via the damper gear 75. For example, a rotary damper using a flow resistance or a rotary damper using a frictional resistance can be used as the first damper 76. The first internal gear 73 is a peripheral portion of the first support shaft 11a, and is provided on a circumferential portion. The first internal gear 73 is formed on an arc centered around the first support shaft 11a on the upper end portion of the front support portion 11.

The first spur gear 72 is disposed such that a part of the first spur gear 72 protrudes forward with respect to the front portion 60f with the cover 60 in the closed position C0.

When the cover 60 rotationally moves by equal to or greater than a predetermined angle around the first support shaft 11a, the first spur gear 72 meshes with the first internal gear 73, and the first spur gear 72 rotates. Then, the first damper 76 applies a load to the rotation of the first spur gear 72 and buffers the rotational movement of the cover 60. The predetermined angle is appropriately set by a shape of the cover 60.

In the buffer mechanism 70 of the front portion 60f, a range in which the first spur gear 72 and the first internal gear 73 do not mesh with each other is provided. A straight line F1 is a straight line passing through the rotation center of the first spur gear 72 and the first support shaft 11a with the cover 60 in the closed position C0. A straight line F2 is a straight line passing through the rotation center of the first spur gear 72 and the first support shaft 11a in a state in which the first spur gear 72 starts to contact the first internal gear 73. A straight line F3 is a straight line passing through the rotation center of the first spur gear 72 and the first support shaft 11a with the cover 60 in the second open position C2.

In a rotational movement range G1 from the straight line F1 to the straight line F2, the first spur gear 72 does not contact the first internal gear 73, and the first damper 76 does not operate. An angle of the rotational movement range G1 is a predetermined angle G1 at which the first spur gear 72 and the first internal gear 73 do not contact each other. Further, the rotational movement range G1 may be set to be a range from the closed position C0 of the cover 60 to a rotational movement position in which the second support shaft 12a and a second engagement member 68 contact each other. In this way, when the cover 60 changes its posture due to contact with the second support shaft 12a, a load is less likely to be applied to the first spur gear 72 and the first internal gear 73.

In a rotational movement range G2 from the straight line F2 to the straight line F3, the first spur gear 72 contacts the first internal gear 73, and the first damper 76 operates. In such a manner, the rotational movement range G1 in which the first damper 76 does not operate and the rotational movement range G2 in which the first damper 76 operates are sequentially provided between the closed position C0 of the cover 60 and the second open position C2.

Figure 4:
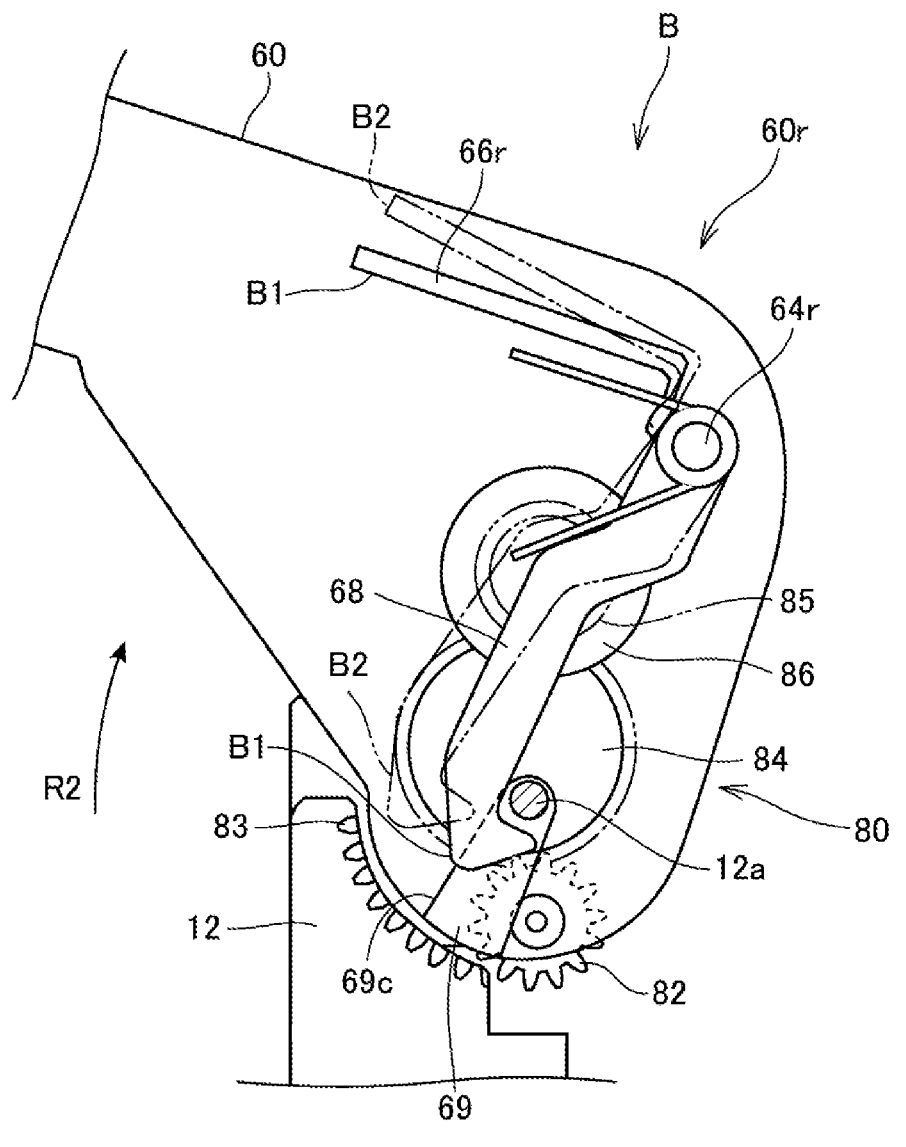
FIG. 4 is a side view of a main portion illustrating an engagement mechanism of a rear support portion and a cover rear portion.
Figure 4:
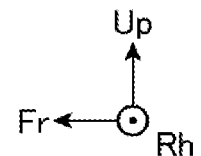

FIG. 4 is a side view of a main portion illustrating an engagement mechanism B of the rear support portion 12 and the rear portion 60r of the cover 60. The engagement mechanism B is constituted by the second engagement member 68, a rear rod 64r that is a rotational movement shaft of the second engagement member 68, and a rear lever 66r that integrally rotationally moves with the second engagement member 68. The second engagement member 68 is fixed to the rear rod 64r. The second engagement members 68 are fixed to left and right end portions of the rear rod 64r so as to be relatively rotationally immovable. Further, the rear lever 66r is fixed to a central portion of the rear rod 64r. The rear lever 66r is rotatably supported on the cover 60 with the rear rod 64r as a rotational movement shaft.

The rear portion 60r of the cover 60 is disposed between the rear support portions 12 provided on the left and right side portions of the printing apparatus 1. The second support shaft 12a that extends toward the cover 60 is provided on the rear support portion 12. Each of the left and right second support shaft 12a together with the first support shaft 11a constitute the support shaft portion 60a that rotatably supports the cover 60. The second support shaft 12a is a short pin protruding toward the cover 60. Then, an extension direction of the second support shaft 12a coincides with the left-and-right direction of the printing apparatus 1.

When the rear portion 60r of the cover 60 is opened, engagement between the engagement mechanism B and the second support shaft 12a is released, and the rear portion 60r is separated from the rear support portion 12.

With the cover 60 in the closed position C0, the second support shaft 12a fits into a guide groove 69 provided in the cover 60 and is locked by the second engagement member 68.

The guide groove 69 is provided in left and right side surfaces of the rear portion 60r of the cover 60. The guide groove 69 is provided obliquely downward on a lower end portion of the rear portion 60r in the closed state of the cover 60. A lower end portion 69b of the guide groove 69 opens downward. When the cover 60 is closed, the second support shaft 12a is introduced into the guide groove 69 from the lower end portion 69b of the guide groove 69. The second support shaft 12a is locked by an upper end portion 69a of the guide groove 69 and the second engagement member 68.

The second engagement member 68 is configured to have a hook shape in which a tip portion is curved in a rotational movement direction. The second engagement member 68 is movable between an engagement position B1 and a release position B2. The second engagement member 68 is biased by a spring 68a so as to be rotationally moved from the release position B2 to the engagement position B1.

The second engagement member 68 protrudes into the guide groove 69 from a front surface 69c of the guide groove 69. The portion of the second engagement member 68 protruding into the guide groove 69 is configured such that the amount of protrusion into the guide groove 69 is reduced toward the lower end portion 69b of the guide groove 69.

In this way, when the rear portion 60r of the cover 60 is closed, the second support shaft 12a is introduced into the guide groove 69 and pushes the second engagement member 68, and thus rotationally moves the second engagement member 68 from the engagement position B1 to the release position B2.

Then, when the second support shaft 12a reaches the upper end portion 69a of the guide groove 69, the second engagement member 68 protrudes into the guide groove 69, and the second support shaft 12a is locked by the second engagement member 68 and the guide groove 69.

When the rear portion 60r of the cover 60 is opened, the locking of the second support shaft 12a is released. By rotationally moving the rear lever 66r upward, the second engagement member 68 retracts from the inside of the guide groove 69, and moves from the engagement position B1 to the release position B2. In this way, the locking of the second support shaft 12a is released, and the second support shaft 12a is movable within the guide groove 69.

In the present exemplary embodiment, a buffering mechanism 80 configured as a gear wheel train that buffers a rotational movement around the rear portion 60r is provided.

The buffering mechanism 80 is constituted by a second internal gear 83 and a second spur gear 82 that are provided on an upper end portion of the rear support portion 12, an intermediate gear 84, a second damper 86, and a damper gear 85 that rotationally moves integrally with a rotational movement shaft of the second damper 86.

The second spur gear 82, the intermediate gear 84, and the second damper 86 are provided on the rear portion 60r of the cover 60. The second internal gear 83 is a peripheral portion of the second support shaft 12a, and is provided on a circumferential portion. The second internal gear 83 is formed on an arc centered around the second support shaft 12a on the upper end portion of the rear support portion 12.

The second spur gear 82 is rotatably supported by the rear portion 60r of the cover 60. A rotational movement shaft of the second spur gear 82 coincides with the left-and-right direction of the printing apparatus 1. The intermediate gear 84 meshing with the second spur gear 82 transmits the rotation of the second spur gear 82 to the second damper 86. Then, the second damper 86 buffers the rotational movement of the second spur gear 82.

The second spur gear 82 is disposed such that a part thereof protrudes downward with respect to the rear portion 60r. Then, when the cover 60 rotationally moves by equal to or greater than a predetermined angle around the second support shaft 12a, the second spur gear 82 meshes with the second internal gear 83, and the second spur gear 82 rotates. Then, the second damper 86 applies a load to the rotation of the second spur gear 82, and buffers the rotational movement of the cover 60. Further, the rotational movement by an empty weight of the cover 60 can be prevented by setting of the second damper 86. The predetermined angle is appropriately set by a shape of the cover 60.

Next, an operation of the buffering mechanisms 70 and 80 will be described.

Figure 5:
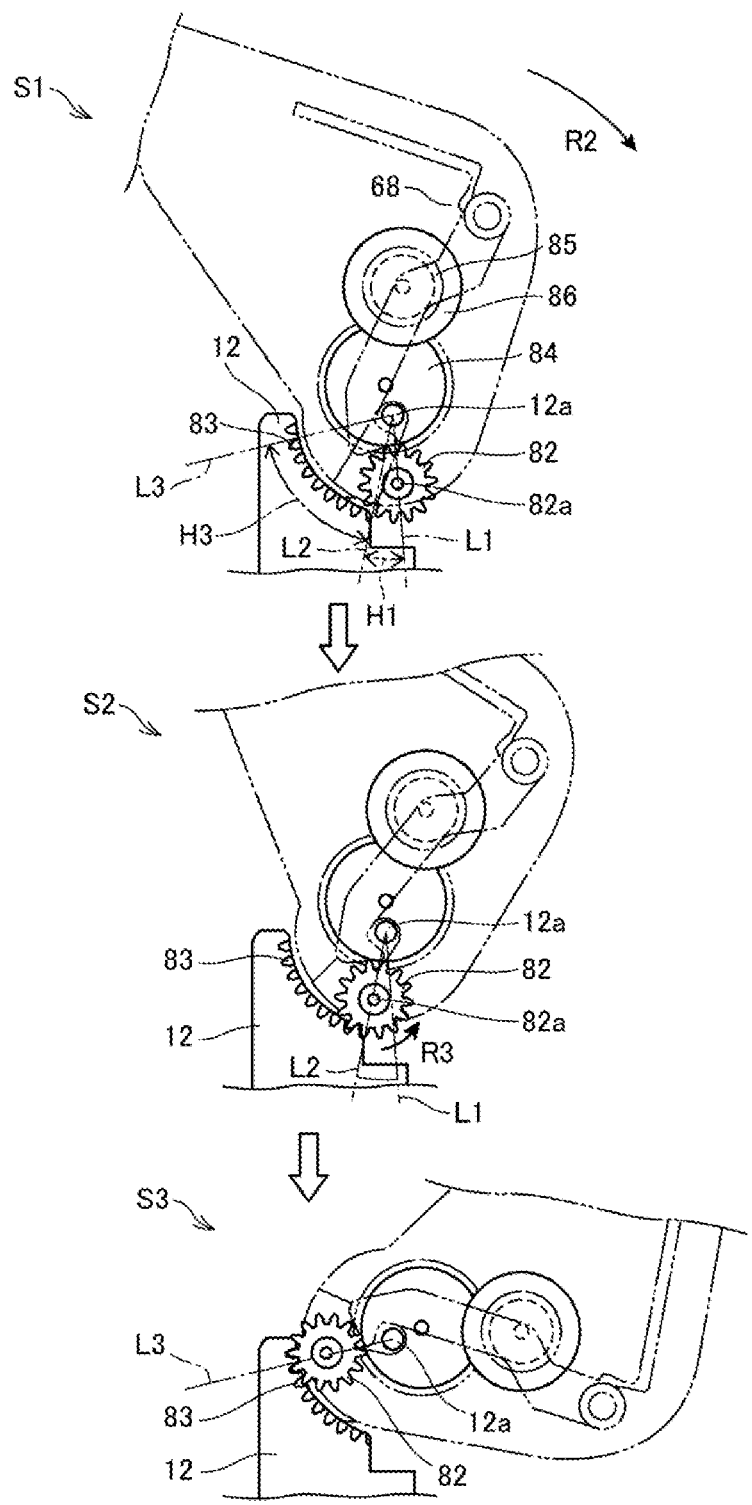
FIG. 5 is an explanatory diagram illustrating an operation of a buffering mechanism of the cover rear portion.

FIG. 5 is an explanatory diagram illustrating the operation of the buffering mechanism 80 of the rear portion 60r of the cover 60. In FIG. 5, a state S1 indicates a state in which the cover 60 is closed.

In this state S1, the second spur gear 82 and the second internal gear 83 do not mesh with each other, and the second damper 86 of the rear portion 60r is not in operation. An angle of a rotational movement range H1 is a predetermined angle H1 at which the second spur gear 82 and the second internal gear 83 do not contact each other.

A state S2 indicates a state in which the front portion 60f of the cover 60 is rotationally moved upward, and the second spur gear 82 and the second internal gear 83 start to mesh with each other. When the second spur gear 82 and the second internal gear 83 start to mesh with each other, the second damper 86 starts to operate.

A state S3 indicates a state in which a maximum rotational movement state to the rear of the cover 60. The state S3 indicates a state in which the cover 60 is opened to the second, open position C2. In the state S3, the rotational movement of the cover 60 into the second direction R2 is regulated by a stopper (not illustrated). A straight line L1 is a straight line that connects the second support shaft 12a and a rotary shaft 82a of the second spur gear 82 in the state S1. A straight line L2 is a straight line that connects the second support shaft 12a and the rotary shaft 82a in the state S2. A straight line L3 is a straight line that connects the second support shaft 12a and the rotary shaft 82a in the state S3.

The cover 60 is rotationally moved from the state S1 to the state S3 with the second support shaft 12a as a rotational movement center. In a range from the state S1 to the state S3, a range in which the second damper 86 does not work is provided. In the rotational movement range H1 of the cover 60 from the state S1 to the state S2, the second spur gear 82 does not contact the second internal gear 83.

Then, in a rotational movement range H2 of the cover 60 from the state S2 to the state S3, the second spur gear 82 contacts the second internal gear 83.

In the rotational movement range H1, the second spur gear 82 and the second internal gear 83 do not mesh with each other. Thus, in the rotational movement range H1, the second damper 86 does not operate.

When the cover 60 is opened with the second support shaft 12a as the rotational movement center, the front lever 66f of the front portion 60f is lifted. The front lever 66f is lifted, and the engagement between the engagement mechanism A and the first support shaft 11a is released. The front portion 60f rotationally moves in the second direction R2. The second damper 86 does not operate until the engagement with the first support shaft 11a is sufficiently released, and thus an operation in the rotational movement range H1 for opening the front portion 60f can be performed smoothly.

In the rotational movement range H2, the second spur gear 82 meshes with the second internal gear 83. At this time, the second spur gear 82 meshes with the second internal gear 83 while rotating in the rotation direction R3.

In this way, the second spur gear 82 is rotationally moved by the rotational movement of the cover 60, and a driving force is transmitted to the second damper 86 via the intermediate gear 84 and the damper gear 85. Then, the second damper 86 operates, and a load is applied to the rotational movement of the cover 60. Thus, when the cover 60 is rotationally moved in the rotational movement range H2, the behavior of the cover 60 during the rotational movement is stabilized by the second damper 86. Further, sudden opening and closing of the cover 60 are suppressed.

When the cover 60 is closed with the second support shaft 12a as the rotational movement center, a state in which the second damper 86 operates in the rotational movement range H2 changes to a state in which the second damper 86 does not operate in the rotational movement range H1, and the first support shaft 11a can easily engage with the cover 60. In this way, the cover 60 can be reliably closed. Further, the front portion 60f of the cover 60 can be closed by using an empty weight of the cover 60. The rotational movement range H1 may be set to be a range from the closed position C0 of the cover 60 to a rotational movement position in which the first support shaft 11a and the first engagement member 65 contact each other. In this way, when the cover 60 changes its posture due to contact with the first support shaft 11a, a load is less likely to be applied to the second spur gear 82 and the second internal gear 83.

In the present exemplary embodiment, immediately before the cover 60 reaches the closed position C0 from the open state, the second spur gear 82 is configured to escape to the outside of the second internal gear 83 such that the second spur gear 82 does not mesh with the second internal gear 83, as illustrated in the state S1 in FIG. 5. Therefore, in the present exemplary embodiment, locking of the second spur gear 82 can be prevented as compared to when the cover 60 reaches the closed position C0 while the second spur gear 82 and the second internal gear 83 mesh with each other.

A resistance of the second damper 86 can be arbitrarily set, and the second damper 86 can also limit the rotational movement due to an empty weight of the cover 60. In this case, the cover 60 can be held in any position between the state S2 and the state S3.

Next, the operation of the buffer mechanism 70 of the front portion 60f illustrated in FIG. 3 will be described.

The operation of the buffer mechanism 70 is almost the same as the operation of the buffer mechanism 80. The rear portion 60r of the cover 60 is rotationally moved from the closed state in FIG. 3 with respect to the front support portion 11 in the first direction R1, and the cover 60 is rotationally moved to the first open position C1, as illustrated in FIG. 1.

The state in FIG. 3 is a state in which the first spur gear 72 and the first internal gear 73 do not mesh with each other, and the buffering mechanism 70 is not in operation. When the cover 60 starts to gradually rotationally move in the first direction R1 from the closed state in FIG. 3, the first spur gear 72 and the first internal gear 73 start to mesh with each other, and the first damper 76 gradually starts to operate similarly to the operation of the buffering mechanism 80 described above. When the cover 60 reaches the first open position C1, which is the maximum rotational movement state to the front, the rotational movement of the cover 60 into the first direction R1 is regulated by a stopper (not illustrated).

The rotational movement range G1 is a range in which the first spur gear 72 does not contact the first internal gear 73, and the first damper 76 does not operate. The rotational movement range G2 is a range in which the first spur gear 72 contacts the first internal gear 73, and the first damper 76 operates. In this way, in the buffer mechanism 70 of the front portion 60f of the cover 60, the rotational movement range G1 in which the first damper 76 does not operate and the rotational movement range G2 in which the first damper 76 operates are also provided similarly to the buffering mechanism 80.

In the present exemplary embodiment, immediately before the cover 60 reaches the closed position C0 from the open state, the first spur gear 72 is configured to escape to the outside of the first internal gear 73 such that the first spur gear 72 does not mesh with the first internal gear 73, as illustrated in FIG. 3. Therefore, in the present exemplary embodiment, locking of the first spur gear 72 can be prevented as compared to when the cover 60 reaches the closed position C0 while the first spur gear 72 and the first internal gear 73 mesh with each other.

A resistance of the first damper 76 can be arbitrarily set, and the first damper 76 can also limit the rotational movement due to an empty weight of the cover 60.

Figure 6:
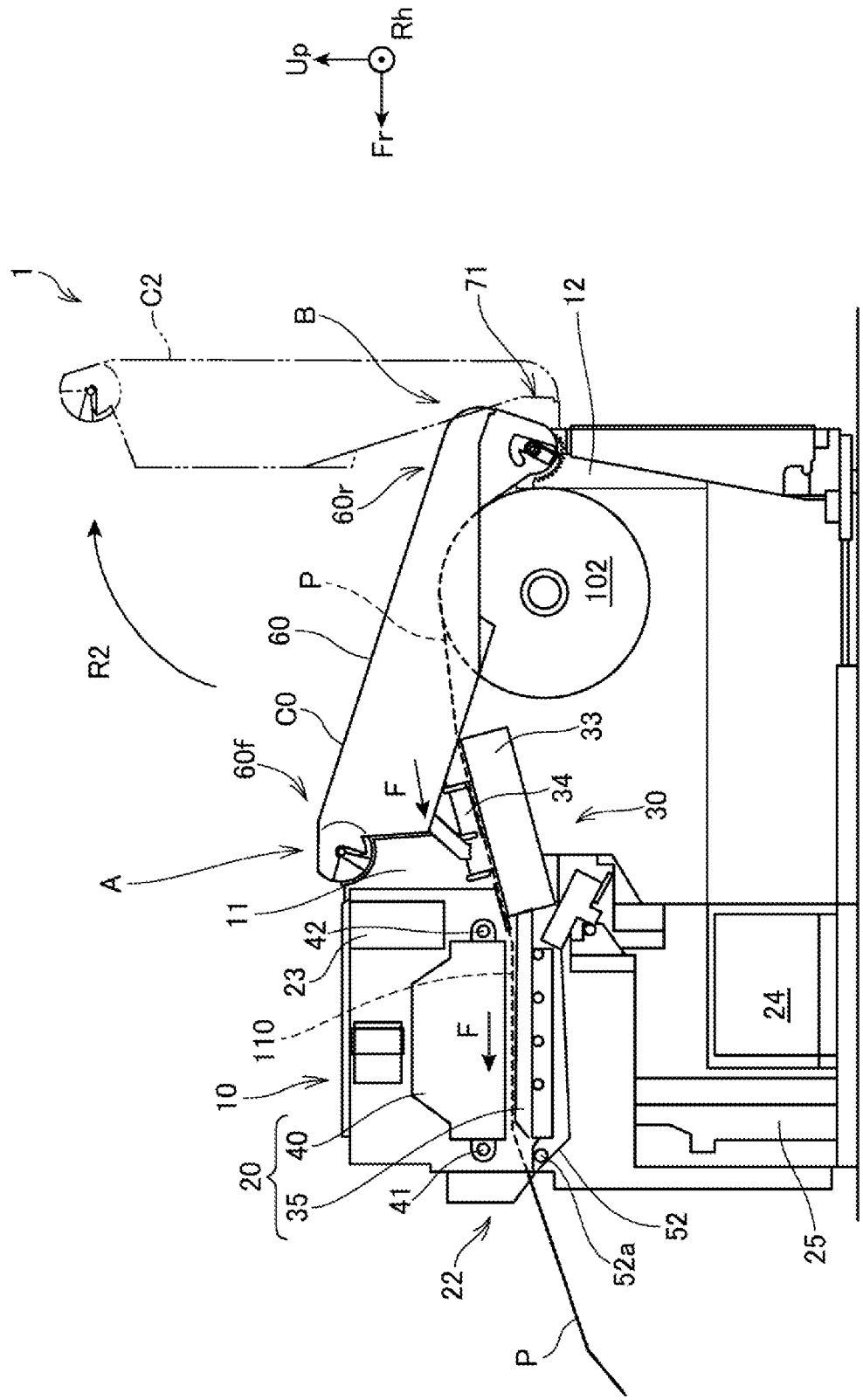
FIG. 6 is a side view illustrating an internal structure of the printing apparatus loaded with roll paper.

FIG. 6 illustrates a state in which roll paper 102 is loaded. The same portion as that in FIG. 1 is denoted by the same reference sign, and description thereof will be omitted.

In the present exemplary embodiment, when the roll paper is loaded from the front of the printing apparatus 1, the front portion 60*f* of the cover 60 is rotationally moved in the second direction R2, and the housing portion 21 is opened. The roll paper 102 is disposed in the opened housing portion 21. One end of the disposed roll paper 102 is pulled out and loaded between the paper guide 33 and the paper holder 34. Then, the sheet P is introduced into the printing unit 20, and the cover 60 is closed. When work is conducted from the front of the printing apparatus 1, the front portion 60*f* of the cover 60 is opened to the second open position C2, and thus a great work space close to the front of the printing apparatus 1 is secured.

In the present exemplary embodiment, the rear portion 60*r* of the cover 60 may be opened to the first open position C1 illustrated in FIG. 1, and the roll paper 102 may be loaded from the rear of the printing apparatus 1.

In the printing apparatus 1 according to the present exemplary embodiment, the front portion 60*f* or the rear portion 60*r* of the cover 60 is opened, and thus fanfold paper and roll paper can be loaded from the front and rear of the printing apparatus 1 along the transport direction F of the sheet P. Therefore, a degree of freedom in the arrangement of the printing apparatus 1 is less likely to be limited for loading work of the sheet P.

The printing apparatus 1 according to the exemplary embodiment to which the present disclosure is applied is a printing apparatus including the printing unit 20 configured to perform printing on the sheet P being a recording medium, the housing portion 21 configured to house an article needed for printing, the cover 60 configured to open and close the housing portion 21, and the support shaft portion 60*a* configured to rotatably support the cover 60. The support shaft portion 60*a* includes the first support shaft 11*a* in a position across the housing portion 21 from the printing unit 20, and the second support shaft 12*a* in a position that is not located across the housing portion 21 from the printing unit 20. The circumferential portion of the first support shaft 11*a* is provided with the first spur gear 72 configured to mesh with the first internal gear 73 provided at the cover 60. The circumferential portion of the second support shaft 12*a* is provided with the second spur gear 83 configured to mesh with the second internal gear 83 provided at the cover 60. With the cover 60 in the closed position C0, the first internal gear 73 does not mesh with the first spur gear 72, and the second internal gear 83 does not mesh with the second spur gear 82. When the cover 60 rotationally moves by the predetermined angle G1 around the first support shaft 11*a* from the closed position C0, the first internal gear 73 and the first spur gear 72 start to mesh with each other. When the cover 60 rotationally moves by the predetermined angle H1 around the second support shaft 12*a* from the closed position C0, the second internal gear 83 and the second spur gear 82 start to mesh with each other.

According to the printing apparatus 1 described above, locking of the first spur gear 72 can be prevented as compared to when the cover 60 is closed while the first spur gear 72 and the first internal gear mesh with each other. Further, locking of the second spur gear 82 can be prevented as compared to when the cover 60 is closed while the second spur gear 82 and the second internal gear 83 mesh with each other. When the cover 60 is closed and contacts the first support shaft 11*a* and the second support shaft 12*a*, and a posture of the cover 60 then changes, the first spur gear 72 and the second spur gear 82 can also be protected. The cover 60 can be opened and closed smoothly, and work for housing and loading the sheet P into the printing apparatus 1 can be easily performed.

In the printing apparatus 1 described above, the transport unit 30 is configured to transport the fanfold paper 101 being an external recording medium to the printing unit 20, the cover 60 in the first open position C1 forms, in the housing portion 21, the opening through which the roll paper 102 is insertable to the housing portion 21, and also opens, at one end of the housing portion 21, the insertion opening 71 that guides the fanfold paper 101 into the printing apparatus 1 main body 10, and the cover 60 in the second open position C2 forms, in the housing portion 21, the opening through which the roll paper 102 and the fanfold paper 101 are loadable on the transport unit 21.

According to the printing apparatus 1 described above, the fanfold paper 101 passes through the insertion opening 71 by closing the cover 60, and thus the fanfold paper 101 can be easily loaded in the printing apparatus 1. Further, a position in which the cover 60 opens can be selected according to a type of the sheet P, and work for replacing the sheet P can be facilitated.

Further, the printing apparatus 1 described above may further include the first engagement member 65 provided at the cover 60, and configured to engage with the first support shaft 11*a* such that the cover 60 is configured to rotationally move from the closed position C0 of the cover 60 to the first open position C1, and disengage from the first support shaft 11*a* by moving with respect to the first support shaft 11*a*, and the second engagement member 68 provided at the cover 60, and configured to engage with the second support shaft 12*a* such that the cover 60 is configured to rotationally move from the closed position C0 of the cover 60 to the second open position C2, and disengage from the second support shaft 12*a* by moving with respect to the second support shaft 12*a*.

According to the printing apparatus 1 described above, the first engagement member 65 engages with the first support shaft 11*a* or the second engagement member 68 engages with the second support shaft 12*a* in the rotational movement state of the cover 60. In this way, the behavior of the cover 60 is stabilized when the cover 60 is opened and closed. Then, work for housing and loading the sheet P accompanied by opening and closing of the cover 60 can be easily performed.

The printing apparatus 1 described above may further include the first spur gear 72 provided at the cover 60, and configured to mesh with the first internal gear 73 provided on the peripheral portion of the first support shaft 11*a* and rotate by the rotational movement of the cover 60 around the first support shaft 11*a*, the first damper 76 configured to apply a load to rotation of the first spur gear 72, the second spur gear 82 provided at the cover 60, and configured to mesh with the second internal gear 83 provided on the peripheral portion of the second support shaft 12*a* and rotate by the rotational movement of the cover 60 around the second support shaft 12*a*, and the second damper 86 configured to apply a load to rotation of the second spur gear 82.

According to the printing apparatus 1 described above, the first damper 76 and the second damper 86 can suppress sudden opening and closing of the cover 60, and the behavior of the cover 60 is stabilized when the cover 60 is opened and closed. In this way, work for housing and loading the sheet P accompanied by opening and closing of the cover 60 can be easily performed.

In the printing apparatus 1 described above, the second support shaft 12a may be located in a direction opposite to the discharge direction of the sheet P with respect to the first support shaft 11a.

According to the printing apparatus 1 described above, the opening direction when the cover 60 rotationally moves around the first support shaft 11a is the discharge direction of the sheet P, and the opening direction when the cover rotationally moves around the second support shaft 12a is opposite to the discharge direction of the sheet P. In this way, the cover 60 opens along the movement direction of the sheet P, and work for housing and loading the sheet P can be easily performed.

Each of the exemplary embodiments described above merely represents one aspect of the present disclosure, and the specific aspects of the present disclosure and the scope of application of the present disclosure are not limited to the exemplary embodiments described above. In the exemplary embodiments described above, the cover 60 is described as a cover that covers the housing portion 21 housing the recording medium. However, the present disclosure is not limited thereto, and the present disclosure is applicable to a cover that covers a housing portion of an article other than the recording medium, for example, a housing portion of a consumable item such as recording paper and an ink cartridge.

What is claimed is:

1. A printing apparatus, comprising:
   a printing unit configured to perform printing on a recording medium;
   a housing portion configured to house an article needed for printing;
   a cover configured to open and close the housing portion; and
   a support shaft portion configured to rotatably support the cover, wherein
   the support shaft portion includes a first support shaft in a position farther than the housing portion from the printing unit, and a second support shaft in a position not farther than the housing portion from the printing unit,
   a circumferential portion of the first support shaft is provided with a first spur gear configured to mesh with a first internal gear provided at the cover, and a circumferential portion of the second support shaft is provided with a second spur gear configured to mesh with a second internal gear provided at the cover,
   when the cover is in a closed position, the first internal gear does not mesh with the first spur gear, and the second internal gear does not mesh with the second spur gear,
   when the cover rotates by a predetermined angle around the first support shaft from the closed position, the first internal gear and the first spur gear start to mesh with each other, and
   when the cover rotates by a predetermined angle around the second support shaft from the closed position, the second internal gear and the second spur gear start to mesh with each other.

2. The printing apparatus according to claim 1, wherein
   a transport unit is configured to transport an external recording medium to the printing unit,
   in a first open position the cover forms, in the housing portion, an opening through which the recording medium is insertable to the housing portion, and also opens, at one end of the housing portion, an insertion opening that guides the external recording medium into a printing apparatus main body, and
   in a second open position the cover forms, in the housing portion, an opening through which the recording medium and the external recording medium are loadable on the transport unit.

3. The printing apparatus according to claim 1, comprising:
   a first engagement member provided at the cover, and configured to engage with the first support shaft such that the cover is rotatable from the closed position of the cover to a first open position, and disengage from the first support shaft by moving with respect to the first support shaft; and
   a second engagement member provided at the cover, and configured to engage with the second support shaft such that the cover is rotatable from the closed position of the cover to a second open position, and disengage from the second support shaft by moving with respect to the second support shaft.

4. The printing apparatus according to claim 1, comprising:
   a first damper configured to apply a load to rotation of the first spur gear; and
   a second damper configured to apply a load to rotation of the second spur gear.

5. The printing apparatus according to claim 1, wherein the second support shaft is located in a direction, opposite to a discharge direction of the recording medium, with respect to the first support shaft.

* * * * *